(No Model.)
D. DOAN.
HORSE HAY RAKE.
No. 358,735. Patented Mar. 1, 1887.
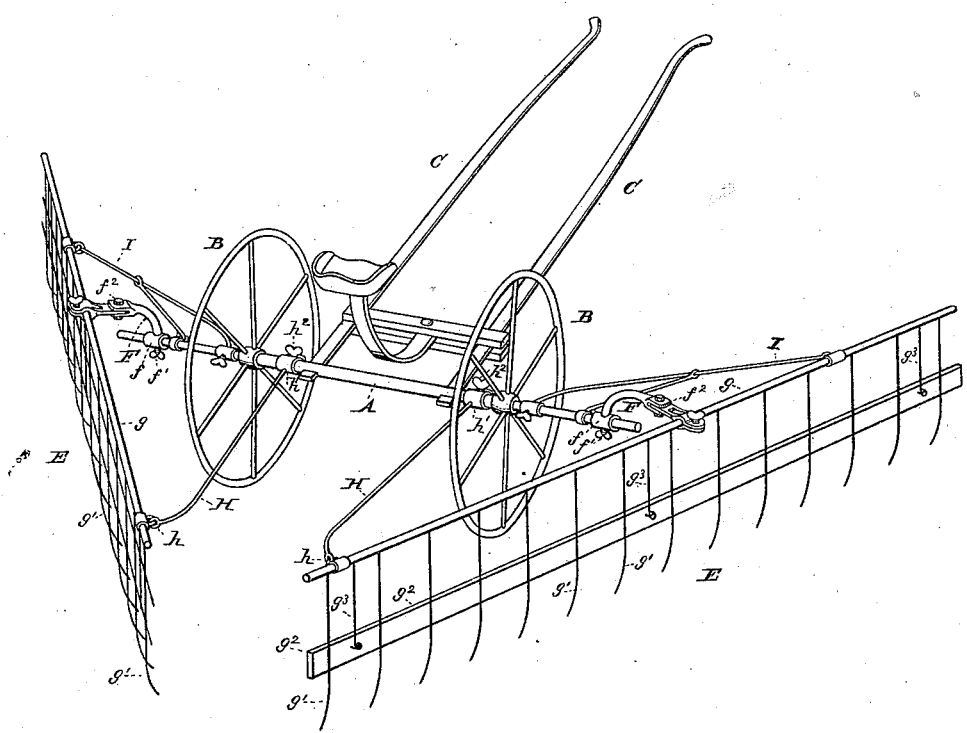
WITNESSES
Villette Anderson.
Philip Leurasi.
INVENTOR
Daniel Doan.
by Anderson & Smith
ATTORNEYS

UNITED STATES PATENT OFFICE.

DANIEL DOAN, OF SPRINGVILLE, IOWA.

HORSE HAY-RAKE.

SPECIFICATION forming part of Letters Patent No. 358,735, dated March 1, 1887.

Application filed July 22, 1886. Serial No. 208,736. (No model.)

*To all whom it may concern:*

Be it known that I, DANIEL DOAN, a citizen of the United States, residing at Springville, in the county of Linn and State of Iowa, have invented certain new and useful Improvements in Horse Hay-Rakes; and I do declare the following to be a full, clear, and exact description of the invention, such as will enable others skilled in the art to which it appertains to make and use the same, reference being had to the accompanying drawing, and to letters or figures of reference marked thereon, which form a part of this specification.

The drawing is a representation of this invention, and is a perspective view.

This invention relates to improvements in horse hay-rakes, the objects being, first, to make the windrows in a direct line behind the rake in the direction the same is traveling; and, secondly, to make the same without dumping the hay.

The objects are accomplished by the construction and novel arrangement of parts hereinafter described, illustrated in the drawing, and pointed out in the claims hereto appended.

Referring by letter to the accompanying drawing, A represents the axle; B B, the wheels; C C, the shafts attached to the axle, all of ordinary construction, and needing no detailed description.

The rakes E E on each side being identical in construction, the description of one only is necessary.

F is a bracket having at its lower end a ring, $f$, adapted to slide on the end of the axle and be secured in position thereon by the set-screw $f'$. The bracket F curves upward and outward from the ring, and has on its upper end a hinge-joint connection, $f^2$, with the rake-head $g$, so that the latter can be turned at various angles to the axle. The hinge-joint connection is attached to the rake-head considerably nearer its front end than its rear end in actual use, but may be adjusted to different positions thereon. The rake E is composed of the rake-head $g$, the teeth $g'$ depending therefrom, and the longitudinal board $g^2$, attached to the rake-head by the vertical bars $g^3$. The board $g^2$, when in position, stands about midway between the rake-head and the end of the teeth, and is for the purpose of sliding the hay backward to form the windrow.

H is a brace-bar having a hinge-connection, $h$, with the rake-head, near the rear end of the latter, and a ring-clutch, $h'$, to pass over the axle inside of the wheels. When in position thereon, it can be secured firmly in place by the binding-screw $h^2$, which passes through a slot in the free end of the ring or loop and engages a properly-threaded opening in the brace-bar.

I is an adjustable brace-rod to aid in holding the front end of the rake-head firmly when the same is in position and prevent it turning on its hinged connection with the bracket F.

The distance between the rear ends of the rakes can be narrowed by sliding the rings $f$ of the bracket and ring-clutches $h'$ of the brace-bars H farther inward on the axle and securing them in their new positions by the described means. The rakes can also have their rear ends turned inward by turning the rake-heads on the brackets F and adjusting the front brace-rods, I, to maintain the angle.

In operation the rakes will, as the machine moves forward, cause the hay to move inward, and the opening between their rear ends will lay it out in a windrow in the line in which the machine is traveling. As the hay is at no time lifted from the ground, no dumping can take place.

The rakes may be attached to a wagon by their heads, if desired. Then by bringing their rear ends together the hay may be accumulated as the wagon moves forward, and when enough is gathered it may be loaded upon the wagon, saving much labor.

Having described this invention, what I claim, and desire to secure by Letters Patent, is—

1. In a horse hay-rake, the combination, with the axle, and the brackets F, sliding thereon, of the rakes connected to the outer ends of said brackets on an inclined position, with their rear ends inward, substantially as specified.

2. In a horse hay-rake, the combination of the axle, and the brackets F, sliding thereon, of the rakes having their heads hinged to the outer ends of said brackets, and the brace-bars having sliding attachments to the axle and hinged attachments with the rake-heads, near the rear ends of the same, substantially as specified.

3. In a horse hay-rake, the combination of the axle, the brackets F, sliding thereon, the rakes having their heads hinged to the outer ends of said brackets, the brace-bars having sliding attachments to the axle and hinged attachments to the rake-heads, near the rear ends of the same, and the adjustable front brace-rods, substantially as specified.

4. In a horse hay-rake, the combination of the axle A, the brackets F, having the rings $f$, set-screws $f'$, and hinge-connections $f^2$, the rakes G, having the heads $g$, and provided with the teeth $g'$ and boards $g^2$, the brace-bars H, having the ring-clutches $h'$, screws $h^2$, and hinge-connections $h$, and the adjustable front brace-rods, I, substantially as specified.

In testimony whereof I affix my signature in presence of two witnesses.

DANIEL DOAN.

Witnesses:
HOSEA WHITE,
C. N. PECK.